Figure 1:
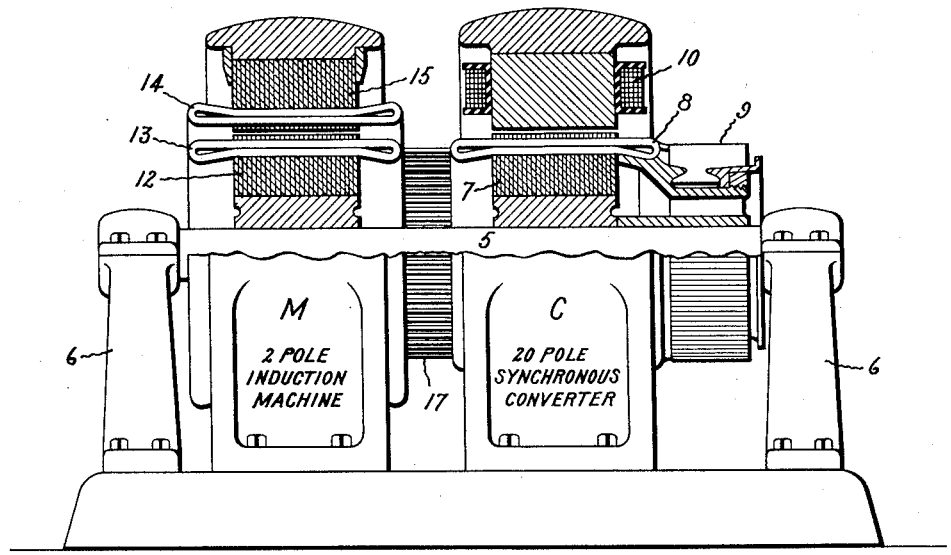

H. M. HOBART.
ELECTRICITY TRANSFORMING AND CONVERTING APPARATUS.
APPLICATION FILED SEPT. 4, 1917.

1,380,961.

Patented June 7, 1921.
2 SHEETS—SHEET 1.

Inventor:
Henry M. Hobart,
by *(signature)*
His Attorney.

H. M. HOBART.
ELECTRICITY TRANSFORMING AND CONVERTING APPARATUS.
APPLICATION FILED SEPT. 4, 1917.

1,380,961.

Patented June 7, 1921.
2 SHEETS—SHEET 2.

Inventor:
Henry M. Hobart,
by *Arthur F. Davis*
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRICITY TRANSFORMING AND CONVERTING APPARATUS.

1,380,961.  Specification of Letters Patent.  Patented June 7, 1921.

Application filed September 4, 1917. Serial No. 189,505.

*To all whom it may concern:*

Be it known that I, HENRY M. HOBART, a citizen of the United States, residing at Schenectady, in the county of Schenectady, State of New York, have invented certain new and useful Improvements in Electricity Transforming and Converting Apparatus, of which the following is a specification.

My invention relates to electricity transforming and converting apparatus, and has for its principal object the provision of certain improvements in such apparatus. More particularly, the object of the present invention is to provide an improved electrical apparatus for converting high tension alternating current electric energy into direct current electric energy of relatively lower voltage. Other objects of the invention will be brought out in the course of the following description.

The apparatus generally employed at the present time for transforming and converting high tension alternating current electric energy into relatively low tension direct current electric energy consists of a stationary polyphase step-down transformer feeding a synchronous converter. In a co-pending application for Letters Patent of the United States filed on Sept. 6, 1916, on behalf of Charles W. Stone and myself, Serial No. 118,635, there is described an improved apparatus of this type in which the secondary winding of the step-down transformer is mounted on the same shaft as the armature winding of the converter and rotates therewith. The primary winding of the transformer may also rotate with the secondary winding, or may be stationary as described in my co-pending application for Letters Patent of the United States filed September 4, 1917, Serial No. 189,504. Another type of transforming and converting apparatus which is used to some extent is known as the motor-converter. The motor-converter consists essentially of an induction machine having a polyphase primary winding and a phase-wound secondary winding electrically connected to the armature winding of a synchronous converter. The induction and converter members of this apparatus usually have the same number of poles, whereby the converter can be designed for one-half the periodicity of the supply. I have discovered and described in a co-pending application filed September 4, 1917, Serial No. 189,506, that the ordinary motor-converter can be made a much more desirable and advantageous apparatus if the number of poles of the induction member is reduced to a minimum, so that this member has only two poles while the converter has a relatively larger number of poles. By thus reducing the pole numbers of the induction member with respect to the converter member, the converter can be designed more nearly as a pure synchronous converter while the induction member functions more nearly as a pure transformer. In some respects the improved apparatus of my present invention more or less resembles each of the apparatus just described.

I have termed the improved apparatus of my present invention a negative converter, because it differs from the motor-converter in that the rotor of the induction member is driven in opposition to the direction of rotation of the magnetic flux of the induction member's primary or stator winding. Essentially, my improved apparatus consists of an induction member having a stationary polyphase primary winding and a polyphase secondary winding electrically connected to the armature winding of a synchronous converter. The secondary winding of the induction member and the armature winding of the converter are mounted on a common rotatable shaft and this shaft is driven by the converter in such a manner that its direction of rotation is opposite to the direction of rotation of the magnetic field of the stationary primary winding of the induction member. The present invention is not only applicable, to a synchronous converter but may be employed in combination with the rotating commutator of a mechanical rectifier as will be more fully described hereinafter.

Figure 2:
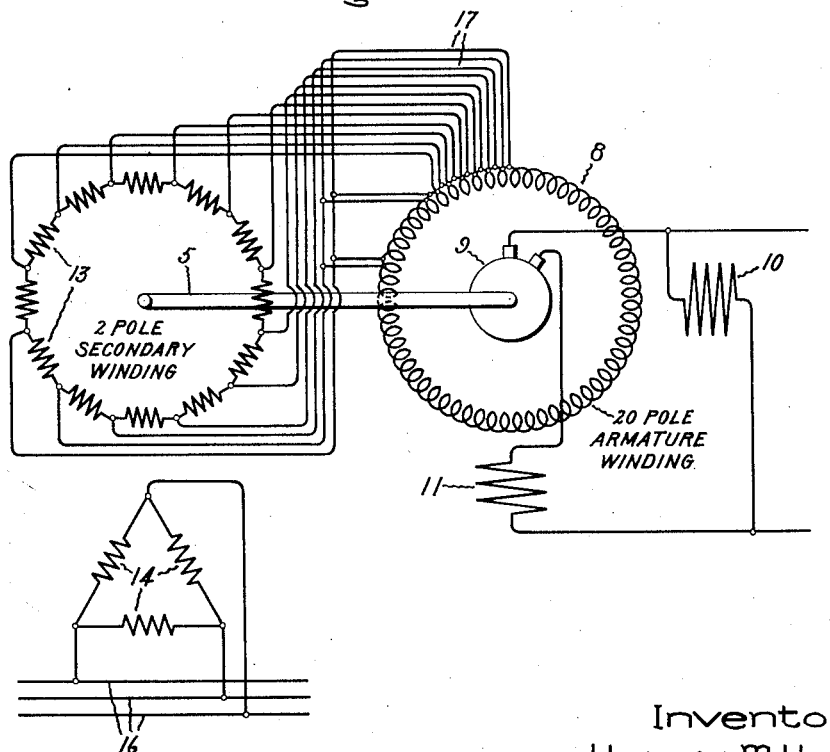
Figure 3:
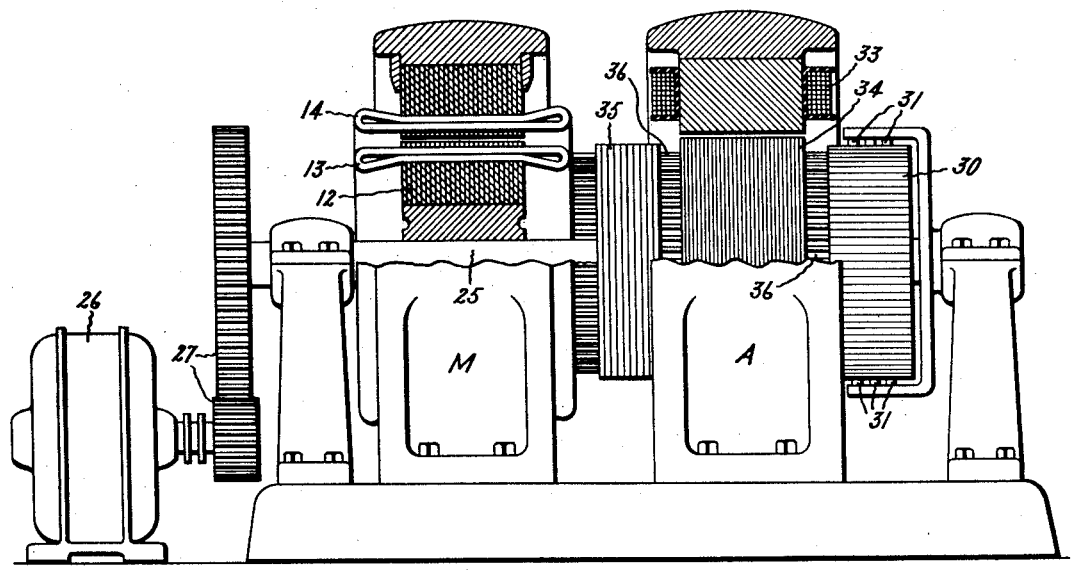
Figure 4:
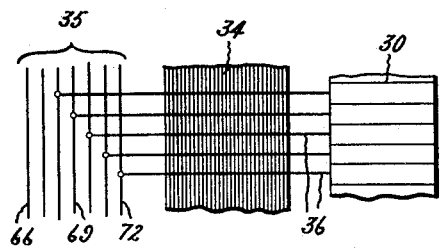

The novel features of the invention which I believe to be patentable are definitely indicated in the appended claims. The construction and mode of operation of apparatus embodying these features will be understood from the following description taken in conjunction with the accompanying drawings, in which:

Figure 1 is an elevation, partly in section, of an electricity transforming and converting apparatus embodying the present invention; Fig. 2 is a conventional diagram of the windings and electrical connections of the apparatus of Fig. 1; Fig. 3 is an elevation, partly in section, of a mechanical rectifier embodying the invention; and Fig. 4 is a view of the electrical connections of the apparatus of Fig. 3.

The apparatus illustrated in Fig. 1 of the accompanying drawings comprises a rotatable shaft 5 mounted in suitable bearings 6. The rotor core 7 of a synchronous converter C is secured to the shaft 5 and carries in suitable peripheral slots an armature winding 8. The armature winding 8 is connected in the usual manner to the segments of a commutator 9. The stationary field magnet system of the converter C consists of a main exciting winding 10 and an interpole winding 11. In Figs. 1 and 2 of the drawings the converter C is represented as having twenty poles, and while it will of course be understood that the machine may have less than 20 poles, nevertheless I believe it will generally be advisable to design the converter with at least ten pairs of poles, and in many instances a greater number of poles will be advantageous.

The induction machine M has a rotor core 12 secured to the shaft 5. The rotor core 12 carries in suitable peripheral slots a bi-polar phase-wound secondary winding 13. Connectors 17 electrically connect the secondary winding 13 at a plurality of points per pair of poles to the armature winding 8 of the converter C. In Fig. 2 of the drawings, I have represented the secondary winding 13 as having twelve equidistant taps which are connected to each pair of poles of the armature winding 8, and since the winding 8 has ten pairs of poles each one of the twelve taps of the secondary winding 13 is connected to ten equidistant points of the armature winding 8. As shown in the drawings, the secondary winding 13 is arranged as a mesh-connected twelve phase winding, but it will of course be understood that this winding may be arranged in different ways, and the secondary winding 13 and armature winding 8 may be connected at less than twelve points per pair of poles, although I believe it will generally be found advisable to have at least twelve taps between the secondary and armature windings, and in many instances it may be desirable to increase the number of taps per pair of poles between these windings.

The primary winding 14 of the induction machine is carried on the stator core 15 and is electrically connected to the high tension alternating current supply system 16. The primary winding 14 is preferably wound for two poles, although in some instances more than two poles may be of advantage, as will be mentioned hereinafter. In accordance with the present invention, the apparatus is so constructed that the shaft 5 is rotated by the converter C in a direction opposite to the direction of rotation of the magnetic field produced by the polyphase primary winding 14.

The apparatus is brought up to speed in any suitable manner, as, for example, by an auxiliary motor. For the purposes of explanation, I will assume that the apparatus illustrated in Figs. 1 and 2 of the drawings is designed so that the shaft 5 has a speed of 400 R. P. M. I will assume that the induction machine is bi-polar and that the converter has twenty poles, and that the periodicity of the alternating current source 16 is 60 cycles. When the shaft 5 is revolving at 400 R. P. M., the primary winding 14 of the induction machine is connected to the alternating current source 16. The shaft 5 will now be driven by the synchronous member C at a speed of 400 R. P. M., and its direction of rotation is opposite to the direction of rotation of the magnetic field produced by the polyphase primary winding 14. The polyphase magnetic field produced by the bi-polar primary winding 14 rotates at a speed of 3600 R. P. M., consequently the speed at which the conductors of secondary winding 13 cut the lines of this primary magnetic field is 3600+400=4000 R. P. M. The currents induced in the secondary winding 13 will, therefore, have a periodicity of $\frac{4000}{3600} \times 60 = 66.7$ cycles per second. Synchronous operation at a speed of 400 R. P. M., is obtained from a 66.7 cycle supply by providing 20 poles. Consequently, the synchronous machine C has 20 poles, as previously mentioned.

The induction machine M may be considered as a transformer receiving alternating current electric energy of 60 cycles from the source 16 and delivering alternating current energy of 66.7 cycles to the converter C. But the energy which is delivered to the converter is not all available as generator output therefrom, because (assuming 100% efficiency) $\frac{66.7-60}{60} \times 100 = 11$ per cent. of the electrical energy received by the converter must be transformed into mechanical energy in the converter to drive the shaft 5 at 400 R. P. M., in opposition to the rotating magnetic field produced by the primary winding 14. If we assume that the efficiency of the apparatus is 100%, we may then consider that the primary winding 14 receives 89 units of electrical energy from the supply 16, and that the secondary winding 13 delivers 100 units of electrical energy to the converter, while the converter returns 11 units of mechanical energy to the secondary winding 13 by means of the shaft 5, and 89 units of direct current energy are delivered from the commutator 9. In delivering the 11 units of mechanical energy to the induction machine, the converter acts as a motor, and consequently, the motor component of the current in the armature winding 8 is greater by some 11%, (as compared with the generator current) than in a pure synchronous converter. Such an excess of the motor component is helpful to commutation and relieves the interpoles, whereas the deficiency of motor current, which is characteristic of the usual motor-converter, is harmful to commutation and adds to the burden falling on the interpoles.

A preponderance of motor current in the armature winding 8 of the converter even up to 25% may in same instances be advantageous. In such cases, with a 60 cycle source of supply as high a shaft speed as 720 R. P. M. may be advantageously employed. For example, take the case of a 12-pole converter and a 2-pole induction machine. The primary magnetic field of the induction machine revolves at 3600 R. P. M. The secondary winding of the induction machine cuts the primary field at a relative speed of 4320 R. P. M., since the shaft's speed is 720 R. P. M. The periodicity of the electricity delivered from the secondary winding of the induction machine to the armature winding of the converter is $\frac{4320}{3600} \times 60 = 72$ cycles per second. The synchronous speed of a 12 pole machine supplied from a 72 cycle source is 720 R. P. M. In this case $\frac{72-60}{60} \times 100 = 20$ per cent. of the input of electrical energy into the converter is transformed therein into mechanical energy to drive the shaft, and (assuming 100% efficiency) 80% is converted into direct current energy and delivered as such from the commutator. The converter of such an outfit consequently has a very large preponderating motor current, so that the number of ampere turns required in the interpole winding is materially reduced. In most instances I believe it will be found that the most desirable outfit will correspond to 10% preponderance of motor component in the converter. But that is not necessarily the limit by which a 100 percent.-transformer can be approached in the negative converter. In machines of 10,000 to 20,000 kilowatts output, suitable shaft speeds may be of the order of half the speeds employed for the largest sizes at present built. Then a 2-pole induction machine will constitute a 95-per-cent.-pure-transformer, or 4 or 6 pole constructions may be employed for the induction machine resulting respectively in 90-per-cent. and 85-per-cent.-puretransformers. In large machines it is a simple matter to satisfactorily effect the connections from the 2-, 4-, or 6-pole induction member to the (say) 30-pole converter member. It is generally desirable to employ about twenty-four taps per pair of poles in such an apparatus.

It will be evident from the foregoing description that the induction machine M is in effect a transformer whose primary winding is stationary and whose secondary winding is mounted on the shaft of the converter. All slip rings are thus dispensed with and the apparatus has no rotating contacts on its A. C. side. The weight to be carried by the rotor shaft is less than where both transformer windings are rotating and consequently the friction and windage losses are less.

The action of the induction machine or member of the negative converter is principally that of a transformer. Thus, in the case of the 20-pole converter, the induction member may be regarded as nine-tenths $\left(\frac{3600}{4000}\right)$ transformer. The remainder of the induction member, that is, one-tenth in the case of the 20-pole converter, may be regarded as a generator. In other words, assuming an efficiency of 100%, approximately 90% of the energy delivered to the converter from the induction member may be considered as derived from the alternating current source by transformer action, while the remaining 10% may be considered as induced in the secondary winding by generator action, the converter member being the motor means for this generator action. But the 10% by which the induction member fails to be exclusively a transformer is not a liability in the negative converter of my present invention but is rather an asset, because it represents a motor characteristic of the armature current of the converter which assists in commutation, and thereby reduces the number of ampere turns that are necessary for the interpole winding.

In Fig. 3 of the drawings, I have shown the principle of the present invention applied to a mechanical rectifier of the synchronously rotating commutator type. The shaft 25 of the rectifier is driven by a synchronous motor 26. The motor 26 may obviously be directly coupled to the shaft 25 or connected thereto by reduction gearing 27 as illustrated in the drawings. The induction machine M is of the same character as in the negative converter and has a stationary polyphase primary winding 14 adapted to be connected to the source of high tension alternating current energy, and a secondary winding 13 carried by the rotor core 12 and electrically connected to the rectifier as hereinafter explained. The shaft 25 is rotated by the synchronous motor 26 in a direction opposite to the direction of rotation of the magnetic field produced by the primary winding 14.

The rectifier proper comprises a commutator 30 secured to the shaft 25. Suitable brushes 31 bear on this commutator and take off the direct current energy in the well understood manner. In order to assist commutation, I consider it advisable, especially in larger outfits, to interpose an auxiliary dynamo-electric machine A between the induction machine M and the commutator 30. This auxiliary dynamo, electric machine A is designed to induce in the coil or conductor undergoing commutation an E. M. F. which will assist in the reversal of the current in such coil or conductor. The machine A may thus be considered as an ordinary direct current dynamo electric machine having interpole windings but having no exciting windings. In Fig. 3 of the drawings, I have represented the machine A as having a stationary field magnet system consisting of a plurality of spools or windings 33 corresponding in position and function to the interpole spools or windings of the ordinary direct current machine, such for example as the usual synchronous converter. The rotor of the machine A consists of a laminated magnetic core 34 having a plurality of peripheral slots in which are located the conductors which connect the secondary winding 13 to the segments of the commutator 30.

I will assume that the induction machine M is wound as a bi-polar machine and that the frequency of the source of alternating current energy is 60 cycles. The auxiliary machine A has twenty spools or interpoles 33, and the commutator 30 has 720 segments. In this outfit, I have shown 72 equidistant taps from the secondary winding 13. These 72 taps are led to 72 bus rings 35. From each one of these 72 bus rings ten equidistant connections are carried to ten equidistant segments of the commutator. Obviously, twenty equidistant sets of brushes bear on the commutator 30, but for the sake of clearness I have shown only two sets of such brushes in Fig. 3 of the drawings.

The connections of the secondary winding 13 to the bus rings 35 and the connections of these bus rings to the commutator 30 will be clearly understood by reference to Fig. 4 of the drawings. Only seven of the 72 bus rings are shown and these seven rings are designated 66—69—72. A single conductor 36 connects a bus ring to the appropriate commutator segment, and this conductor passes through one of the peripheral slots of the rotor core 34. In Fig. 4, I have shown five of the conductors 36, and it will be understood from the foregoing description that there are 10 of these conductors connected at equidistant points to each bus ring and to the appropriate commutator segments.

The rotor core 34 is made of only sufficient width to permit of generating in a conductor 36 when passing under an interpole 33 a voltage equal and opposite to the reactance voltage requiring to be counteracted. When the proportions are such that the core 34 would otherwise have to be very wide and expensive, the conductor 36 may obviously be replaced by a coil of several turns, one side of such a coil lying under one interpole 33 and the other side under an adjacent interpole of opposite polarity.

As in the case of the negative converter of Figs. 1 and 2, the secondary winding 13 is rotated by the synchronous motor 26 in a direction opposite to the direction of rotation of the magnetic field produced by the primary winding 14. If the motor 26 is a four-pole machine its speed will be 1800 R. P. M. and the ratio of reduction of the gearing 27 may be 4.5 to 1 in order to drive the shaft 25 at a speed of 400 R. P. M. The frequency of the current in the secondary winding 13 will be 66.7 cycles. The induction machine M may be considered 90% a transformer and 10% a generator. The power to drive this 10% generator component is supplied by the motor 26 through the gearing 27.

From the foregoing descriptions it will be seen that the improved apparatus of my present invention comprises a polyphase induction machine supplying polyphase alternating current electric energy to a synchronous apparatus adapted to convert such polyphase alternating current energy into direct current electric energy. The synchronous apparatus produces a relative rotation of the primary and secondary windings of the induction machine in a direction opposite to the direction of rotation of the magnetic field produced by the polyphase primary winding thereof, so that the alternating current energy fed by the secondary winding to the synchronous apparatus is of a higher periodicity than the alternating current energy of the high tension supply system. The object which has heretofore led to the employment of the ordinary motor converter, as heretofore constructed, has been that of reducing the design difficulties by supplying a periodicity a great deal lower (usually one-half) than the periodicity of the alternating current supply system. In order to obtain this much lower periodicity, the designer has heretofore been willing to accept the disadvantages of a greatly preponderating generator characteristic in the commutating member of the apparatus. In the apparatus of my copending application, Serial No. 189,506, I have decreased this preponderating generator characteristic of the commutating member by reducing the number of poles of the induction member to a minimum, and in such apparatus I aim to employ as nearly as possible the high periodicity of the alternating current supply, only accepting the small reduction in periodicity unavoidably resulting from the interpolation of the induction member, as a necessity to obtaining the advantage of the excellent construction for a step-down transformer with a stationary primary winding and a secondary winding which can be carried on the rotatable shaft and which is admirably adapted to providing a large number of phases for supplying the commutator member which I desire shall be as nearly a pure synchronous converter as is consistent with employing this construction. In the apparatus of my present invention, I have departed even farther from the ordinary motor converter, since I supply the commutator member with alternating current energy of a higher periodicity than that of the alternating current supply system, but where the commutator member is a synchronous converter this produces a preponderating motor component of the armature current which assists in commutation and thereby lessens the commutating flux which must be supplied by the interpoles, so that the interpoles can be made smaller than in a pure synchronous converter.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. An electricity transforming and converting apparatus comprising in combination an induction machine having a stationary polyphase primary winding and a rotatable polyphase secondary winding of a relatively small number of poles so that said induction machine functions substantially as a pure transformer, a synchronous apparatus including a rotatable armature and commutator for converting polyphase alternating current energy into direct current energy and having a relatively large number of poles so that said synchronous apparatus functions substantially as a pure synchronous converter, means for mechanically connecting said armature of said synchronous apparatus and said secondary winding of said induction machine, and means electrically connecting the polyphase secondary winding of said induction machine to the armature winding of said synchronous apparatus in such a manner that said secondary winding is rotated in a direction opposite to the direction of rotation of the magnetic field produced by said primary winding, thereby causing the armature current of said synchronous apparatus to have a component in a direction to neutralize the armature reaction of said synchronous apparatus and improve its commutating characteristics.

2. Electricity transforming and converting apparatus comprising in combination an induction machine having a polyphase primary winding and a polyphase secondary winding with a relatively small number of poles so that said induction machine functions substantially as a pure transformer, a synchronous converter having a commutated armature winding and a field magnet system of a relatively large number of poles so that said synchronous converter functions substantially as a pure synchronous converter, means for mechanically connecting said armature of said synchronous apparatus and said secondary winding of said induction machine, and means electrically connecting said secondary winding to said armature winding in such a manner that said secondary winding is rotated in a direction opposite to the direction of rotation of the magnetic field produced by said polyphase primary winding, thereby causing the armature current of said converter to have a component in a direction to neutralize the armature reaction of said converter and improve its commutating characteristics.

In witness whereof, I have hereunto set my hand this first day of September 1917.

HENRY M. HOBART.